United States Patent [19]

Brunet et al.

[11] Patent Number: 4,873,695
[45] Date of Patent: Oct. 10, 1989

[54] LASER WITH DISCHARGE IN A TURBULENT TRANSVERSE FLOW

[75] Inventors: Henri Brunet, L'Hay Les Roses; Michel Mabru, Bures Sur Yvette; Philippe Chauvet, Chatenay Malabry, all of France

[73] Assignee: Compagnie Generale D'Electricite, Cedex, France

[21] Appl. No.: 224,626

[22] Filed: Jul. 27, 1988

[30] Foreign Application Priority Data

Jul. 27, 1987 [FR] France .............................. 87 10629

[51] Int. Cl.⁴ .............................................. H01S 3/02
[52] U.S. Cl. ........................................ 372/58; 372/87
[58] Field of Search ............................. 372/58, 81, 87

[56] References Cited

U.S. PATENT DOCUMENTS

| | | | |
|---|---|---|---|
| 3,666,982 | 5/1972 | Wiegand | 372/58 |
| 3,720,885 | 3/1973 | Koloc | 331/94.5 |
| 4,156,207 | 5/1979 | Reilly | 372/58 |

OTHER PUBLICATIONS

IEEE Journal of Quantum Electronics, vol. QE-21, No. 2, Feb. 1985, pp. 113-116, IEEE, New York, U.S.A.; R. McLeary: "Operation of a $CO_2$ Mixing Laser at Atmospheric Pressure".

*Primary Examiner*—James W. Davie
*Attorney, Agent, or Firm*—Sughrue, Mion, Zinn, Macpeak & Seas

[57] ABSTRACT

An active gas based on $CO_2$ penetrates under pressure into a discharge chamber (20) via injection orifices (10) formed through the upstream face of said chamber. These orifices leave considerable solid portions (22) about themselves in said face such that the gas forms jets which diverge up to an outlet grid (12) constituting a common anode. Cathodes (8) are individually powered by a block (14) and give rise to discharges which are widened on the edges of said jets by large-amplitude gas recirculation currents, thereby increasing the electrical power injected. The invention is particularly applicable to power lasers.

10 Claims, 3 Drawing Sheets

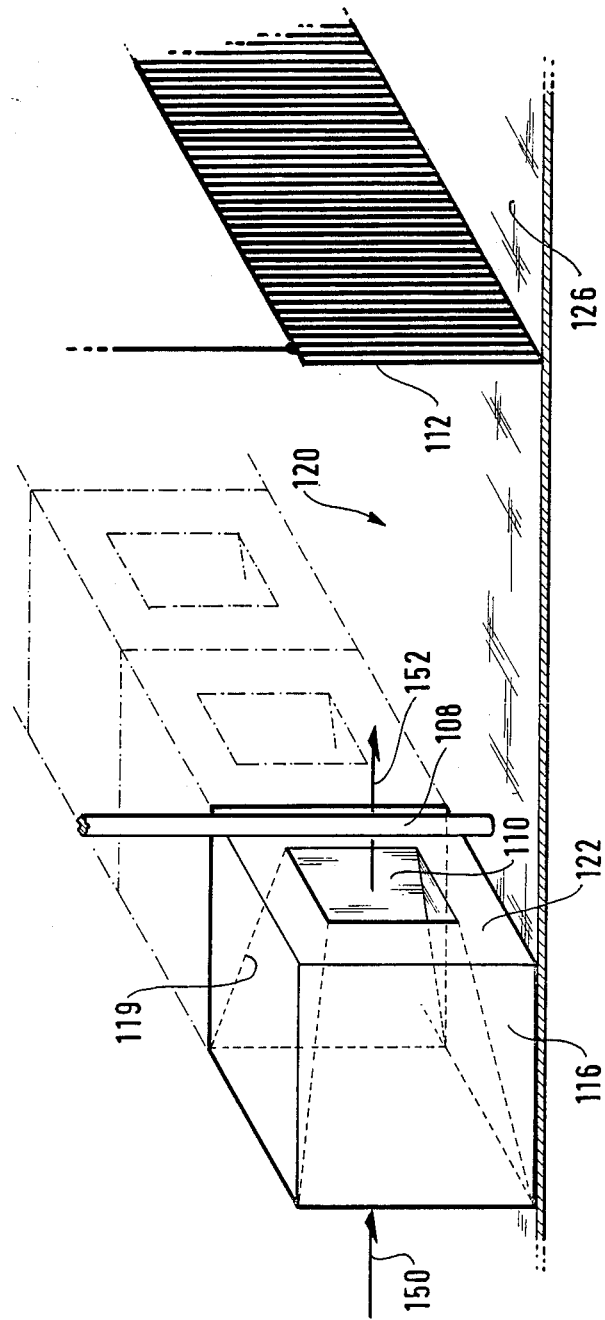

LASER WITH DISCHARGE IN A TURBULENT TRANSVERSE FLOW

The present invention relates to providing coherent and powerful light beams, particularly with infrared light, using a so-called "active" gas. The gas is excited by an electric discharge in order to induce a population inversion therein, enabling radiation to be amplified and optionally enabling laser oscillation to take place.

BACKGROUND OF THE INVENTION

It is known that inducing turbulence in the active gas makes it possible to obtain uniform and stable discharges in large diameter tubes. H. BRUNET, M. MABRU and . GASTAUS, "Gas flow and Chemical Lasers" 1986, ed. by S. Rosenwaks (Springer Verlag, 1986), p. 40. Discharges in $CO_2$-$H_2$-He mixtures are characterized by high power densities varying from more than 20 $W/cm^3$ for small diameter tubes (e.g. 2 cm) to about 2.5 $W/cm^3$ for tubes of 10 cm diameter.

In such discharges, the electric field extends along the flow direction and along the radiation direction and the discharge is then called a "turbulent axial flow" (TAF) discharge. An experimental industrial $CO_2$ laser having a power of 7 kW has been made using four tubes having a diameter of 7.5 cm and a length of 80 cm. M. GASTAUD, "Etude de sources laser a gaz carbonique" Rapport EDF. 26 November 1986.

TAF discharges are well adapted to making axial flow lasers. However, they suffer from the drawback of requiring one or two Roots type compressors to be used in order to generate the pressure difference which sets up the turbulence.

$CO_2$ lasers are also known in which the flow is transverse relative to the radiation direction. These lasers have several advantages which are mentioned below.

In most known transverse flow lasers a uniform discharge is obtained in a volume of several liters by using very many electrodes (several hundred) in order to split up the discharge into as many elementary discharges. (Toshiba) S. IKUTA and S. FUJIWARA, In Technical Digest, CLEO 1985, paper TUC2; (Spectra Physics, Mitsubishi) N. TABATA et al, "Gas Flow and Chemical Lasers" 1984, ed. A. S. Kaye and A. C. Walker (Adam Hilger, 1984) p. 1; (Culham) A. S. KAYE et al, "Gas Flow and Chemical Lasers" 1982, ed. by M. ONORATO (Plenum Press, 1982) p. 383. In general, a single electrode, the cathode or the anode, is segmented with the other electrode remaining single and being constituted by a grid or a bar. For example, in a volume of 20 liters (l) (10 cm×10 cm×200 cm), the 5 kW Toshiba lasers use a set of 600 cathodes and 3 anodes.

Experiments concerning stabilization by turbulence were described several years ago in addition to using numerous cathodes (one or more per cm). A. C. ECKBRETH and J. W. DAVIS, Appl. Phys. Letters, 19, 101 (1971); W. J. WIEGAND and W. L. NIGHAN, Appl. Phys. Letters, 26, 554 (1975). The turbulence devices were designed to render the speed profile upstream from the cathodes uniform and to set up small scale turbulence.

Other means have also been used for improving the quality of the discharges. In some lasers (Mitsubishi's SAGE laser, Majectic Laser's Pie concept), discharge preionization devices are added in order to increase the uniformity of the discharge.

For small volumes, it is also known to replace D.C. excitation (or A.C. at several kHz) by a radiofrequency discharge (13 MHz or 27 MHz) in order to obtain discharges which are stable and uniform at high pressure. E. HUGEL, Proc. SPIE's 1986, Vol. 650 p. 2; P. HOFFMAN Proc. SPIE's 1986, Vol. 650, p. 23. This technique suffers from the drawback of requiring a radiofrequency power supply which costs more than a D.C. or an A.C. power supply.

The object of the present invention is to increase the amount of electrical power that can be injected into a turbulent transverse flow laser discharge without destabilizing the discharge, thereby, in particular, making it possible to increase the light power of such a laser.

Another object of the invention is to make such a discharge more uniform and/or stable.

SUMMARY OF THE INVENTION

The invention seeks to achieve such objects in a manner which is simple and cheap, i.e., in particular, with a small number of electrode power supply circuits and with a compression ratio which is considerably less than two, and which is obtained by using pumping means that consume considerably less mechanical power than would be consumed by conventional Roots type compressors for maintaining the turbulent flow of active gas. The invention seeks in particular to obtain improved uniformity and/or stability by using a number of electrodes which is considerably less than one per centimeter of discharge width.

For these objects, a laser according to the present invention uses diverging gas jets in which electrical discharges are formed from upstream electrodes located at the origins of said jets. More specifically, the present invention provides a laser with discharge in a turbulent transverse flow, said laser comprising:

optical means for causing light radiation to circulate or oscillate;

a discharge chamber having a length between an upstream face and a downstream face which extends along a width and a height of said chamber;

circulation means for circulating an active gas in said discharge chamber and forming a subsonic turbulent flow from said upstream face to said downstream face; and electrical means for establishing at least one electric discharge in said active gas inside said discharge chamber between at least one upstream electrode and a downstream electrode situated in said upstream and downstream faces respectively, so that said discharge is made uniform and/or stable by said turbulent flow, thereby enabling said gas to amplify said light radiation;

said circulation means comprising:

a plurality of insertion passages through said upstream face enabling active gas to be inserted into said discharge chamber, each of said passages corresponding to a discharge module which is the portion of said discharge chamber in which the gas inserted via said orifice circulates, said module having an upstream surface and a downstream surface which are those portions of said upstream and downstream faces respectively that are occupied by said module;

evacuation passages in said downstream face to enable said active gas to be evacuated from said chamber; and pressure maintaining means for maintaining a pressure ratio on insertion of more than one, said ratio being the ratio between the pressure of said active gas upstream from said insertion passage relative to the working pressure of said gas in said discharge chamber;

said laser being characterized by the fact that each of said insertion passages is an injection orifice occupying a minority fraction of the area of said upstream surface and surrounded by one or more reserved portions occupying the remainder of said upstream face in such a manner that the gas injected via said orifice forms a corresponding diverging jet leaving one or more corner spaces to one side constituting portions of the corresponding said discharge module;

said injection orifice being provided with one of said upstream electrodes to form a discharge in said diverging jet starting at the origin thereof; and at least a portion of at least one of said downstream electrodes being distributed in said downstream surface in order to diffuse said electrical discharge throughout the volume of the jet.

Said corner spaces are in contact with said reserved portion(s) and recirculation flows take place therein constituted by active gas taken from said jet. The pressure is slightly reduced therein.

According to the invention, the following dispositions may also be adopted, which dispositions are advantages, at least in some cases:

said injection orifice occupies between 5% and 30% of the area of said upstream surface; and said discharge chamber length lies between one half and twice the length which is required to ensure that each diverging jet occupies all of the downstream surface of said corresponding discharge module.

Said injection pressure ratio lies in the range 0.15 to 2. This ratio is selected in such a manner that the recirculation gas currents generated in said corner space from said diverging jet cause said electric discharge to penetrate into said space in spite of the position of said upstream electrode.

In addition, by virtue of the reduced pressure obtaining in the corner space, the reduced electric field $E/N$ is increased, thereby encouraging lateral extension of the discharge, with said electric field being the ratio $E/N$ of the electric field E divided by the number N of gas molecules per unit volume.

Each of said upstream surface and said infection orifice has a width-to-height ratio lying in the range 0.5 to 2, said items being substantially concentric so that said corner spaces constitute a ring around the upstream portion of said diverging jet.

The ratio of the length of said discharge chamber to the smallest dimension of said injection orifice lies in the range 2 to 20, and typically between 6 and 8.

Said upstream electrode corresponding to one of said injection orifices is unique and is centered on said orifice, and situated slightly downstream therefrom.

Said modules follow one another along the width of said discharge chamber, said radiation oscillating or circulating along said width.

Said upstream electrodes are powered separately with current which is substantially predetermined by said electrical means, and said downstream electrodes are all constituted by a common grid.

Said active gas circulation means comprise a fan causing the gas to circulate around a closed circuit, cooling means, and means for continuously regenerating said gas on said circuit.

An implementation of the present invention within the scope explained above is described below in greater detail by way of non-limiting example and with reference to the accompanying diagrammatic figures. When the same item appears in several figures it is designated therein by the same reference symbol. The implementation described includes the dispositions mentioned above as being advantageous in accordance with the invention. It should be understood that the elements mentioned may be replaced by other elements providing the same technical functions.

BRIEF DESCRIPTION OF THE DRAWINGS

FIG. 4 is a fragmentary perspective view of a second laer emitter constituting a preferred embodiment of the present invention.

DESCRIPTION OF THE PREFERRED EMBODIMENTS

Figure 1:
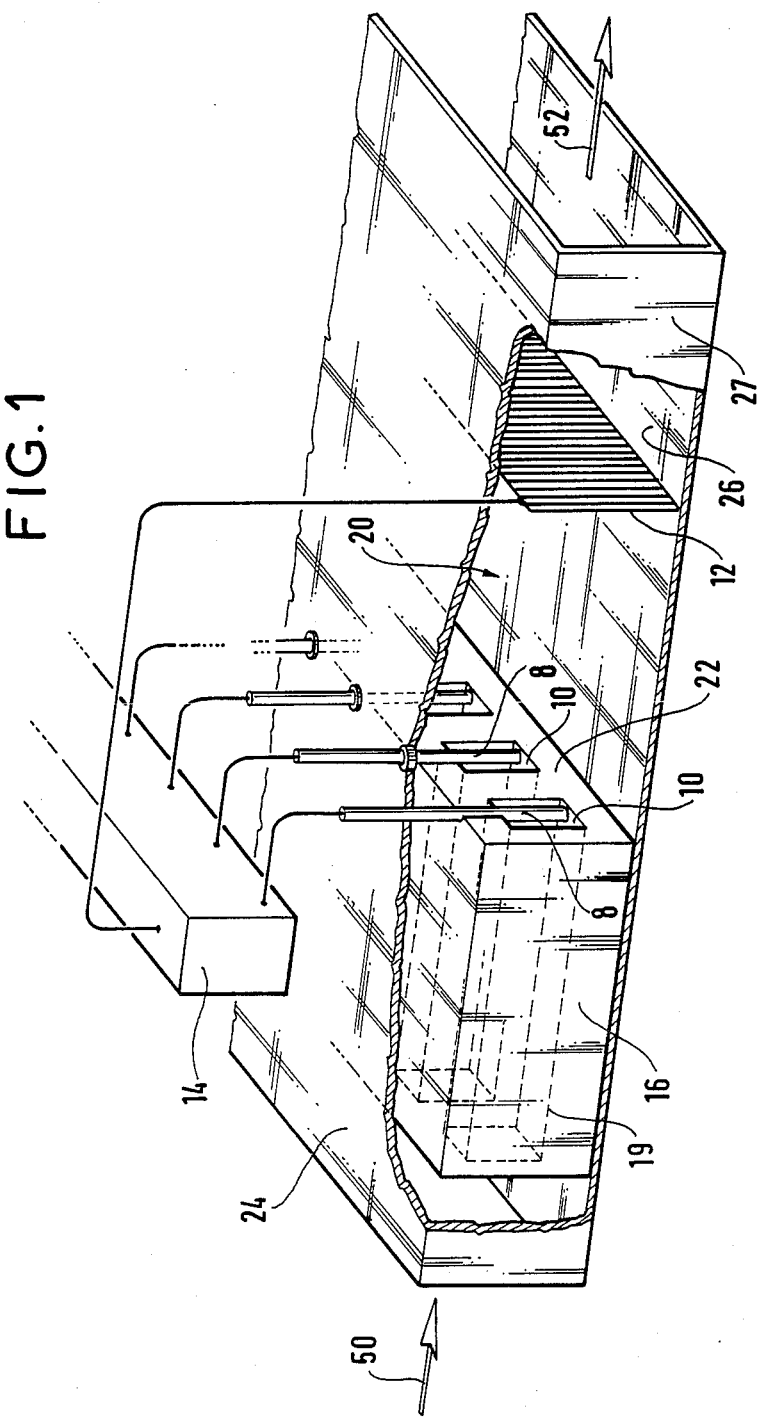
FIG. 1 is a fragmentary perspective view of a first laser in accordance with the invention having its discharge chamber partially cut-away, said laser being an emitter described for illustrating the principles of the invention.

In these laser emitters, said optical means cause light radiation to oscillate in an optical cavity occupying the discharge chamber. In the first laser, these means are two mirrors such as 2 (FIG. 2), with one of the mirrors being partially transparent. The direction of the radiation is the same as the direction of four horizontal tie-bars such as 4 which extend over the width of the discharge chamber and which hold the mirrors by means of end plates 6. In each module, said electrical means comprise an upstream electrode such as cathode 8 (FIGS. 1 and 3). This is constituted by a vertical bar disposed on the axis of the module injection orifice 10. The downstream electrode is an anode 12 which is common to all of the modules. It is constituted by a highly transparent grid of vertical bars. The wide passages 13 between the bars constitute said evacuation passages. An electrical power supply block 14 serves firstly to feed each of said cathodes individually with a predetermined current by means of a connection passing through the insulating top wall of the discharge chamber 20. Secondly, it is connected to the anode 12.

Each module such as 16 includes a portion of a common insulating block 18. This portion is the portion surrounding a gas admission channel 10 which is longitudinal and formed in said block. The channel belongs to the module. It opens out via an injection orifice such as 10 into the discharge chamber 20. Said reserved portions 22 of the upstream face are solid portions constituted by the surface of the block in contact with said chamber. The module also includes a portion of the top wall 24 and the bottom wall 26 of said chamber, and a portion of the anode 12. Said top and bottom walls extend upstream and downstream from the discharge chamber 20.

Said circulation means comprise closed circuit ducts 2 (see FIG. 2) for conveying the gas to the inlet to said admission channels in the block 18 and for extracting the gas downstream from the anode 12 by means of fans 30.

Downstream from the anode 12 the gas is guided by side walls such as 27 which connect with the duct 28.

The discharge chamber includes openings in its side walls for mirrors such as 2. These are disposed at a distance from the discharge zone in order to avoid being damaged.

Figure 2:
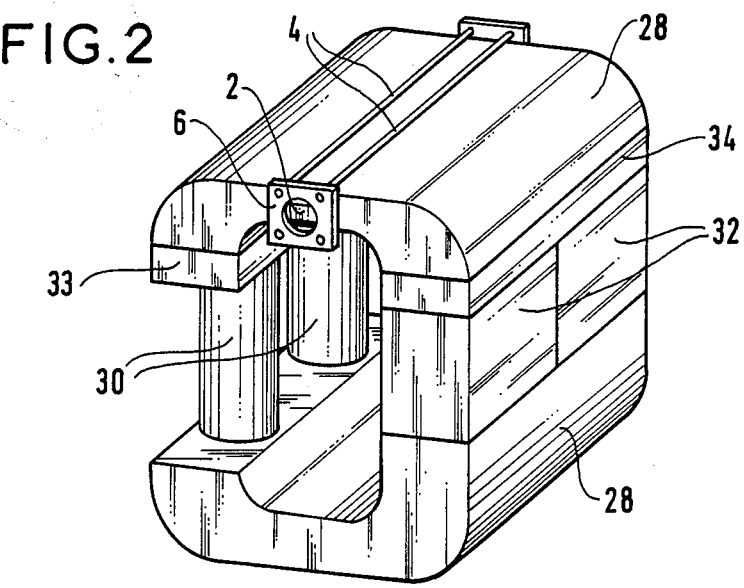
FIG. 2 is an overall perspective view of said laser.
Figure 3:
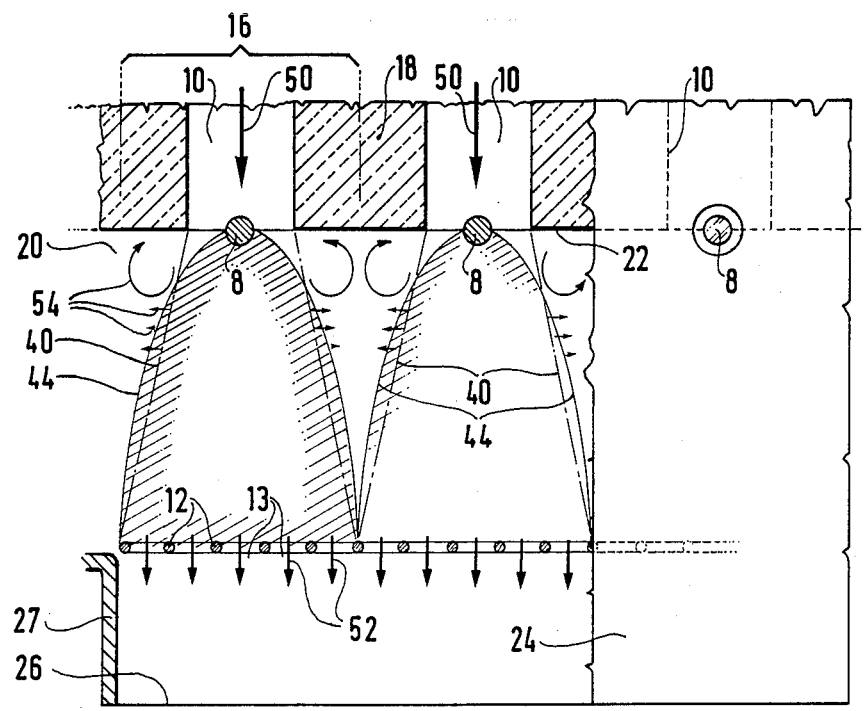
FIG. 3 is a view of the FIG. 1 discharge chamber shown in section on a horizontal plane halfway up the chamber, with the gas jets being shown in dashed lines with shading representing the zones occupied by electric discharges, and with arrows showing the gas flows.

In FIGS. 1 and 2, the flow of active gas is represented by arrows such as 50 upstream from the discharge chamber, 52 downstream from the discharge chamber, and 54 in the said corner spaces.

We now begin by explaining the main aspects of turbulent transverse flow discharge in accordance with the invention.

In a discharge plasma, the motion of positive ions is identical to the motion of neutral particles because of the high frequency of collisions between the ions and said neutral particles at the pressures used. Further, the electrons are bound to the ions by electrical forces which ensure that the plasma is neutral. As a result, the electrons follow the motion of the ions approximately and thus also the motion of the neutral particles. I.e. the discharge current which is transported above all by the electrons moves with the masses of gas which are constituted above all by neutral particles and by ions.

The present invention makes it possible to extend the transverse dimensions of the discharge by using the aerodynamic movements of the gas.

The sudden expansion of the gas as it passes through the injection orifice of a module causes considerable recirculation currents (see FIG. 3) to appear, in particular towards the top, bottom, and side surfaces of the discharge cell constituted by the gas contained in said module. This recirculation takes place in said corner spaces which lie between the jet of gas, the top, bottom, and side surfaces of the cell, and the solid portions of the upstream surface. The recirculation causes a portion of the particles to go from the center towards these top, bottom, and side surfaces.

We now consider the electric field distribution in the discharge cell. It is characterized by a high concentration towards the upstream electrode (generally the cathode) and it tends to be limited to a central zone which is roughly the shape shown in FIG. 3.

If there is no turbulent flow, the electrons are essentially distributed within said zone. By virtue of the movements of the gas and also because the pressure of the gas is lower in the recirculation zone constituted by said corner spaces, electrons are entrained out from said central zone and the discharge is considerably widened.

Further, the high degree of turbulence produced by the sudden expansion serves to stabilize the discharge.

More particularly, the laser described includes tubular cathodes 8 which are 4 mm in diameter and which are generally cooled, together with a grid acting as an anode. The height of the discharge chamber 20 is 4 cm and its length is 6 cm to 10 cm (see FIG. 1). The width of each cell within said chamber, i.e. the width of each module is 4 cm. A wide discharge can be obtained by juxtaposing modules which are 4 cm wide (and 4 cm high) modules.

The turbulence necessary for stabilizing the discharge is obtained in each cell by injecting a $CO_2$-$N_2$-He mixture via a square injection orifice 10 whose section is considerably less than that of the discharge cell. It appears that the injection orifice should occupy between 5% and 50%, and preferably between 5% and 30%, e.g. about 25%, of the upstream surface of the corresponding module.

The cathode is placed in the middle of the orifice, slightly downstream therefrom (other dispositions are possible). This orifice is fed from a same-section admission channel for steadying the gas flow prior to its expansion through the orifice into the discharge chamber.

The upstream to downstream pressure ratio is a function of the section of the gas inlet orifice and may lie in the range 1.05 to 2.

This ratio and the area of the gas insertion orifice are selected so that the injection speed is slightly greater than 200 meters per second (m/s). This corresponds to a section ratio of 0.25 for the following nominal operating conditions (pressure=50 mbar—molar throughput=0.15 moles per second). The upstream and downstream pressure difference is then 7 mbar.

Reducing the section of the orifice increases both the injection speed and the pressure difference.

The electrical power which may be injected into the discharge increases with increasing upstream pressure, as for turbulent longitudinal discharge. It varies over the range 3.5 $W/cm^3$ to 6 $W/cm^3$ for a discharge of length 10 cm established in a $CO_2$-$N_2$-He mixture=0.04-0.48-0.48 at a pressure of about 60 mbar.

The laser in accordance with the invention is particularly advantageous at low pressure ratios.

By way of indication, when the pressure ratio increases from 1.1 to 1.2, the injected power density increases from 4.2 $W/cm^3$ to 6.0 $W/cm^3$ under nominal operating conditions.

For a ratio of 1.10, the power density injected into the discharge is more than twice that injected into the 5 kW Toshiba laser. It can be substantially increased by replacing the D.C. power supply with an alternating power supply at a frequency of more than 10 kHz. In this case, it is necessary to use a symmetrical set of electrodes.

Given the low pressure ratio, an aircraft industry fan 30 (such as that provided by the French firm Technofan) may be used for circulating the gas mixture.

In order to obtain a laser power of 3 kW from a discharge power density of 4 $W/cm^3$, together with an overall efficiency of 15%, the discharge volume must be about 5000 $cm^3$. Given the characteristics of the modules investigated, this leads to juxtaposing 30 modules over a length of 1.2 meters (m). The main characteristics of the discharge are then as follows:

| | |
|---|---|
| Volume | 4.0 cm high 10 cm long 120 cm wide |
| Number of modules | 30 |
| Pressure in the discharge | 55 mbar |
| Pressure ratio | 1.05 or higher |
| Volume throughput | 2000 l/s (at 55 mbar) |
| Electrical power density | 4.0 $W/cm^3$ |
| Charging voltage between electrodes | 4.0 kV |
| Maximum amplification coefficient | 0.7% per cm |

The cavity is of the unstable type. It includes three X-folded passages having a total length of about 3.60 m. The effective amplification length is about 4.2 m, thereby giving a gain of considerably more than 1.5. A magnification factor M=2 may be used without difficulty. A cavity having 2 U-configuration passages may also be used.

The amplification coefficient varies little in the vertical direction and is symmetrical about the mid-plane. This symmetry does not exist in transverse discharges where the electric field is perpendicular to the gas flow.

The mechanical stability of the cavity may be ensured by the low expansion steel tie-bars 4, or else by carbon-carbon composite tubes (L=about 1.4 m).

Gas circulation around the closed circuit is provided by two fans 30 each having a throughput of 1000 l/s at 55 mbar providing a pressure increase of 10 mbar. Two heat exchangers 32 and 33 having a total capacity of 20 kW give rise to a little headloss (less than 2 mbar) and serve to maintain the gas mixture at constant temperature. A gas catalyst device 34 is also incorporated in the gas circulation loop as is a device (not shown) for partially renewing the mixture.

The electrical power supply block 14 (5 kV-5 A) is a current regulated D.C. power supply. It could be replaced by an alternating power supply.

The maximum laser power is 3.6 kW in multimode operation. It is 2.8 kW with an unsteady cavity having M=2, with the outside diameter of the beam being about 3 cm.

FIG. 4 is a fragmentary representation of a second laser which is analogous to the first above-described laser except for the following points.

Items which are analogous to items in the first laser are designated by reference numerals which are the same except that they have 100 added thereto.

The cathode 108 is placed about 1 cm downstream from the injection orifice 110. The orifice is fed from a gas admission channel 119 having the same inlet section (in this case 4 cm×4 cm) as the inlet section to the discharge cell situated downstream therefrom. It is approximately pyramid-shape.

Its outlet section which constitutes the injection orifice has a rectangular section of 1.8 cm by 2.2 cm. The length of the discharge chamber is 10 cm.

Compared with rapid flow laser configurations (CI 4000) and large tube configurations (TAF 10), the laser of the present invention has the following advantages:

No Roots compressor. Roots compressors are heavy, bulky, and noisy, they consume a large amount of energy and they pollute the gases in the loop. The Technofan fans are integrated in the circulation loop. They have low power consumption (3 kW instead of 15 kW) and they do not pollute the gas mixture once the degassing stage has been completed. Vibration and noise are reduced.

A 5 kV electrical power supply is used instead of a 15 kV power supply (CI 4000) or a 30 kV power supply (TAF 10). An all-semiconductor power supply can be provided. Electrical insulation problems are simple.

The optical cavity is short in length (1.4 m between mirrors), thereby making it possible to provide a mechanical structure which is simple and which has very high stability. The equivalent length is more than 3.5 m for the CI 4000.

Greatly reduced bulk and weight. The overall volume (excluding the THT power supply) is about 1 m³.

Because of its simplicity, the cost of this laser is remarkably low.

We claim:

1. A laser with electrical discharge in a turbulent transverse flow, the laser comprising:
   optical means (2) for causing light radiation to circulate or oscillate;
   a discharge chamber (20) having a length between an upstream face (10, 22) and a downstream face (12) which extends along a width and a height of said chamber;
   circulation means (18, 28, 30) for circulating an active gas in said discharge chamber and forming a subsonic turbulent flow from said upstream face to said downstream face; and
   electrical means (8, 12, 14) for establishing at least one electric discharge in said active gas inside said discharge chamber between at least one upstream electrode (8) and a downstream electrode (12) situated in said upstream and downstream faces (10, 20; 12) respectively, so that said discharge is made uniform and/or stable by said turbulent flow, thereby electrically exciting said gas so as to enable said gas to amplify said light radiation;
   said circulation means comprising:
   a plurality of insertion passages through said upstream face (10, 22) enabling active gas to be inserted into said discharge chamber (20), each of said passages corresponding to a discharge module which is the portion of said discharge chamber in which the gas inserted via said orifice circulates, said module having an upstream surface and a downstream surface which are those portions of said upstream and downstream faces respectively that are occupied by said module;
   evacuation passages (13) in said downstream face to enable said active gas to be evacuated from said chamber; and
   pressure maintaining means (30) for maintaining a pressure ratio on insertion of more than one, said ratio being the ratio between the pressure of said active gas upstream from said insertion passage relative to the working pressure of said gas in said discharge chamber;
   the improvement wherein each of said insertion passages is an injection orifice (10) occupying a minority fraction of the area of said upstream surface and surrounded by one or more reserved portions occupying the remainder of said upstream face in such a manner that the gas injected via said orifice forms a corresponding diverging jet (40) leaving one or more corner spaces to one side constituting portions of the corresponding said discharge module (16);
   said injection orifice being provided with one of said upstream electrodes (8) to form a discharge (44) in said diverging jet (10) starting at the origin thereof; and
   at least a portion of at least one of said downstream electrodes (12) being distributed in said downstream surface in order to diffuse said electrical discharge throughout the volume of the jet.

2. A laser according to claim 1, characterized by the fact that said injection orifice occupies between 5% and 30% of the area of said upstream surface; and
   said discharge chamber (20) length lies between one half and twice the length which is required to ensure that each diverging jet occupies all of the downstream surface of said corresponding discharge module.

3. A laser according to claim 2, characterized by the fact that said injection pressure ratio lies in the range 0.15 to 2.

4. A laser according to claim 2, characterized by the fact that each of said upstream surface (10, 22) and said injection orifice (10) has a width to height ratio lying in the range 0.5 to 2, said items being substantially concentric so that said corner spaces (42) constitute a ring around the upstream portion of said diverging jet (40).

5. A laser according to claim 4, characterized by the fact that the ratio of the length of said discharge chamber (20) to the smallest dimension of said injection orifice (10) lies in the range 2 to 20.

6. A laser according to claim 5, characterized by the fact that said ratio lies typically in the range 6 to 8.

7. A laser according to claim 1, characterized by the fact that said upstream electrode (8) corresponding to one of said injection orifices (10) is unique and is centered on said orifice.

8. A laser according to claim 1, in which a plurality of said modules (16) follow one another along the width of said discharge chamber (20), said radiation oscillating or circulating along said width.

9. A laser according to claim 1, in which said upstream electrodes (8) are powered separately with current which is substantially predetermined by said electrical means (14), and said downstream electrodes are all constituted by a common grid (12).

10. A laser according to claim 1, in which said active gas circulation means comprise a fan (30) causing the gas to circulate around a closed circuit (28), cooling means (32), and means (34) for continuously regenerating said gas on said circuit.

* * * * *